United States Patent
Wenzel et al.

(10) Patent No.: US 11,651,482 B2
(45) Date of Patent: May 16, 2023

(54) METHOD FOR OBTAINING AT LEAST ONE SIGNIFICANT FEATURE IN A SERIES OF COMPONENTS OF THE SAME TYPE AND METHOD FOR THE CLASSIFICATION OF A COMPONENT OF SUCH A SERIES

(71) Applicant: YXLON INTERNATIONAL GMBH, Hamburg (DE)

(72) Inventors: Thomas Wenzel, Hamburg (DE); Jeremy Simon, Ann Arbor, MI (US)

(73) Assignee: YXLON INTERNATIONAL GMBH, Hamburg (DE)

(*) Notice: Subject to any disclaimer, the term of this patent is extended or adjusted under 35 U.S.C. 154(b) by 1065 days.

(21) Appl. No.: 16/385,423

(22) Filed: Apr. 16, 2019

(65) Prior Publication Data

US 2019/0325268 A1 Oct. 24, 2019

(30) Foreign Application Priority Data

Apr. 24, 2018 (DE) .......................... 102018109816.2

(51) Int. Cl.
*G06K 9/00* (2022.01)
*G06F 18/214* (2023.01)
(Continued)

(52) U.S. Cl.
CPC ........ *G06F 18/2148* (2023.01); *G06F 18/213* (2023.01); *G06F 18/2155* (2023.01);
(Continued)

(58) Field of Classification Search
CPC .. G06K 9/6257; G06K 9/6232; G06K 9/6259; G06K 9/6228; G06K 9/6256;
(Continued)

(56) References Cited

U.S. PATENT DOCUMENTS 7,720,274 B2 * 5/2010 Katahata ................ G06T 7/001
382/145
2005/0175231 A1 * 8/2005 Hirata ................ G06V 10/7715
382/141
(Continued)

FOREIGN PATENT DOCUMENTS

CN 105092616 A 11/2015
EP 1903335 A1 3/2008
(Continued)

OTHER PUBLICATIONS

Jul. 8, 2022 Notification of Reasons for Refusal in connection with corresponding Japanese patent application No. 2019-082824.

*Primary Examiner* — Van D Huynh
(74) *Attorney, Agent, or Firm* — Amster, Rothstein & Ebenstein

(57) ABSTRACT

Method for obtaining at least one significant feature in a series of components of the same type on the basis of data sets by non-destructive testing. The method includes examining a classified random sample of components which have a known production sequence, by a non-destructive testing. A three-dimensional data set for each component is obtained, and components of the sample are divided by good and rejected parts. Defect-free component regions from all of the components of the random sample are extracted. At least one feature which is characteristic of the type of component and production process which, over a predetermined time of component production, exhibits considerable characteristic differences between the good and rejected parts is determined. The determination can be accomplished using neural networks, machine learning approaches, or statistics from the field of data analytics. The at least one feature and its characteristic is defined as a trained classifier.

9 Claims, 2 Drawing Sheets

(51) Int. Cl.
    *G06N 3/02*    (2006.01)
    *G06T 7/00*    (2017.01)
    *G06N 20/00*   (2019.01)
    *G06F 18/213*  (2023.01)

(52) U.S. Cl.
    CPC ............... *G06N 3/02* (2013.01); *G06N 20/00* (2019.01); *G06T 7/0012* (2013.01); *G06T 2207/10081* (2013.01)

(58) Field of Classification Search
    CPC ........ G06N 3/02; G06N 20/00; G06T 7/0012; G06T 2207/10081; G06T 2207/30164; G06T 7/001; G07C 3/146
    USPC .......................................................... 706/20
    See application file for complete search history.

(56) References Cited

U.S. PATENT DOCUMENTS

| | | | | |
|---|---|---|---|---|
| 2007/0143718 | A1* | 6/2007 | Abercrombie | G06F 30/30 716/112 |
| 2008/0033686 | A1* | 2/2008 | Kratschmer | G06Q 10/06 702/123 |
| 2011/0188735 | A1* | 8/2011 | Hosoya | G06T 7/001 382/149 |
| 2012/0083917 | A1* | 4/2012 | Zhou | G05B 19/41875 700/110 |
| 2013/0279791 | A1* | 10/2013 | Kaizerman | G06T 7/0004 382/145 |
| 2013/0279795 | A1* | 10/2013 | Shlain | G06T 7/0004 382/149 |
| 2013/0294680 | A1* | 11/2013 | Harada | G06T 7/11 382/149 |

FOREIGN PATENT DOCUMENTS

| | | |
|---|---|---|
| JP | 2006292725 A | 10/2006 |
| JP | 2009070235 A | 4/2009 |
| JP | 2013093027 A | 5/2013 |
| JP | 2013236087 A | 11/2013 |

* cited by examiner

METHOD FOR OBTAINING AT LEAST ONE SIGNIFICANT FEATURE IN A SERIES OF COMPONENTS OF THE SAME TYPE AND METHOD FOR THE CLASSIFICATION OF A COMPONENT OF SUCH A SERIES

CROSS REFERENCE TO RELATED APPLICATION

This application claims priority to German patent application number DE 10 2018 109816.2, filed on Apr. 24, 2018, the content of which is incorporated by reference herein in its entirety.

FIELD OF THE INVENTION

The present invention relates to a method for obtaining at least one significant feature in a series of components of the same type on the basis of data sets, which have been obtained by means of a non-destructive testing method, as well as a method for the classification of a component of a series of components of the same type on the basis of data sets, which have been obtained by means of a non-destructive testing method, with the aim of carrying out an evaluation of the manufacturing process and, in particular, a trend detection and of being able to influence the process proactively.

BACKGROUND OF THE INVENTION

The methods used until now for evaluating and controlling a production process with various process parameters using computed tomography data rely exclusively on information which is obtained from defects or discontinuities. These are observations which are compiled in each case from individual evaluations and therefore do not produce a relationship between the components manufactured in the series (population). In addition, it is to be noted that the majority of the data obtained, in particular in the case of computed tomography (CT), is not incorporated into the evaluation at all. These data are all the regions in the component which are free from discontinuities and defects. In the field of CT this is typically 90-95% of the data which accrue during the inspection of each component examined. In the case of defect-free components, with these known methods, no further information accrues other than the information that the component is okay.

X-ray CT enables the three-dimensional representation, in particular of internal structures, of components examined using this method. The internal structure of components varies as a consequence of many influences on the process, which can be reflected in structural changes. These changes differ in nature depending on the manufacturing process and on the materials or combinations of materials being used. Depending on the characteristic of the change, these are acceptable in wide ranges, but can be visualized by the X-ray CT.

SUMMARY OF THE INVENTION

The object of the present invention is therefore to provide a method which makes it possible to train a system and then to inspect such components, in which discontinuities which lead to the rejection of the produced components are avoided and variations and above all trends in the production process can be detected at an early stage.

This object is achieved according to the invention by a method with the features of claim 1 and of claim 5. Advantageous embodiments are specified in the dependent claims.

According to these, the object is achieved by a method for obtaining at least one significant feature in a series of components of the same type on the basis of data sets, which have been obtained by means of a non-destructive testing method, having the following steps:

examining a classified random sample of components, the sequence of the production of which is known, by means of a non-destructive testing method with obtaining in each case of a 3D data set for each component;

splitting the components of the random sample into good parts and reject parts;

extracting defect-free component regions from all of the components of the random sample;

determining at least one feature which is characteristic of the type of component and the production process thereof and which, over the course of time of the production of the components, exhibits considerable differences in its characteristic between good parts and reject parts, by means of neural networks, machine learning approaches, such as multiple instance learning, or statistical methods from the field of data analytics, or, from a predetermined quantity of features, by means of genetic programming or conventional statistical methods;

defining this at least one feature and its characteristic as trained classifier.

This represents the first step, which is designed as a learning phase. The starting point is a qualified random sample, i.e. a series of components for which the sequence in which they were produced is known. The essential subdivision which is necessary for the qualification in the learning phase is the splitting of the random sample into good parts and reject parts (OK/NOK). In the first step of the method, for example a machine learning method is used, which automatically identifies the features which are characteristic of the process and type of component and exhibit considerable differences in their characteristic between good parts and reject parts. Alternatively, the features can also be selected from a predetermined quantity.

An advantageous development of the invention provides that, in addition to the last step according to the invention—the definition of the at least one feature as trained classifier—at least one process parameter is incorporated into the production of the components in that it is determined whether there is a correlation between this process parameter and the at least one feature and the characteristic thereof and, if this is the case, this at least one feature and its characteristic is defined as trained classifier, otherwise the above determination of the correlation is carried out for another process parameter until there is a correlation, and then the at least one feature is defined as trained classifier; if a correlation is not found for any of the process parameters, the steps of claim 1 are carried out for another feature and then the above steps of this claim are repeated for this other feature. If the above-named process parameters are incorporated into the learning phase, in principle the possibility can arise to produce a direct correlation between features which were identified in the volume data set and process parameters. A control and automated optimization of the process parameters on the basis of X-ray image information is thus possible.

A further advantageous development of the invention provides that several features are determined in accordance with step d of claim 1 and, by means of a combination of at least two features, the correlation with at least one process parameter is produced. As a rule, changes in one process parameter are not only followed by the change in one feature but it is more complex with the result that several features are affected when one process parameter is changed. Moreover, through the combination of features, the significance of the correlation can be increased.

The following are used as process parameters, for example: pressures, temperatures, electrical and mechanical stresses or flows of the production process, ambient temperatures or air humidities. It is to be ensured that the process parameters at the time of the manufacture of the component can be assigned to this (individual) specifically.

A further advantageous development of the invention provides that the method is carried out only on a spatial region of the components that can be predetermined. The amount of volume data to be considered is thereby reduced for later steps, which leads to an acceleration of the process.

According to claim 6, the object is achieved by a method for the classification of a component of a series of components of the same type on the basis of data sets, which have been obtained by means of a non-destructive testing method, having the following steps:

using the trained classifier obtained by reference to one of the above claims to carry out a trend analysis of whether a development of the characteristic feature of a reject part is present by means of neural networks, machine learning approaches, such as multiple instance learning, or statistical methods from the field of data analytics, or, from a predetermined quantity of features, by means of genetic programming or conventional statistical methods;

communicating that no corrective is necessary in the component production process when no such development was detected, alternatively communicating a warning and/or carrying out automatic corrective measures in the component production process, in the event that process parameters were used in obtaining the trained classifier, through correction of these process parameters via an interface with the manufacturing machine.

The second phase—after the learning phase—is establishing whether there is a deterioration of the process in the production process, which could lead to a deterioration of the components and, in the most unfavourable case, to the rejection of the components and optionally, by changing the relevant process parameters, to be able to counteract this deterioration and also optionally to do this automatically. The characteristic features which were determined in the learning phase are used. If the features, the characteristic thereof for the various component qualities and possibly also the regions in the component are identified in the learning phase, in the second phase, the application takes place—this is therefore also called the application phase—of the data learned in the first phase. In the case of series inspection, all the components lined up for inspection are examined by means of computed tomography. The results of the feature determination are evaluated together with the possibly available process parameters by a trend analysis, which e.g. is in turn based on machine learning or uses statistical methods. If a trend is detected which develops in the direction of the characteristic feature of the reject components (NOK), a regulating intervention in the process can be initiated. This intervention, which relies on the results of the trend analysis, can be carried out automatically if the process parameters were part of the learning data set and can be continuously detected in the application phase. According to the invention, there is thus the possibility to intervene in the process and thus the production of reject components can be prevented. A prediction of process behaviour with a corresponding proactive reaction is thereby possible.

An advantageous development of the invention provides that at least one defect-free component region is extracted in the examined component and the method according to the invention for classification is carried out only in this defect-free component region. In the case of such an approach, regions in the component are segmented in order to increase the significance of the features. With this step, in particular the amount of volume data to be considered for later steps can be reduced and the time required for the evaluation is considerably reduced.

A further advantageous development of the invention provides that the non-destructive testing method carried out is a computed tomography method, in particular an X-ray tomography method. A particular advantage of a computed tomography method is the high density of information obtained, whereby there is a high probability of finding significant features. Alternatively to X-ray tomography methods, methods with ultrasound or millimetre waves, terahertz spectroscopy or thermography could also be used.

BRIEF DESCRIPTION OF THE DRAWINGS

Further details and advantages of the invention are now to be explained in more detail with reference to an embodiment example represented in the drawings.

There are shown in.

DETAILED DESCRIPTION OF THE INVENTION

Figure 1:
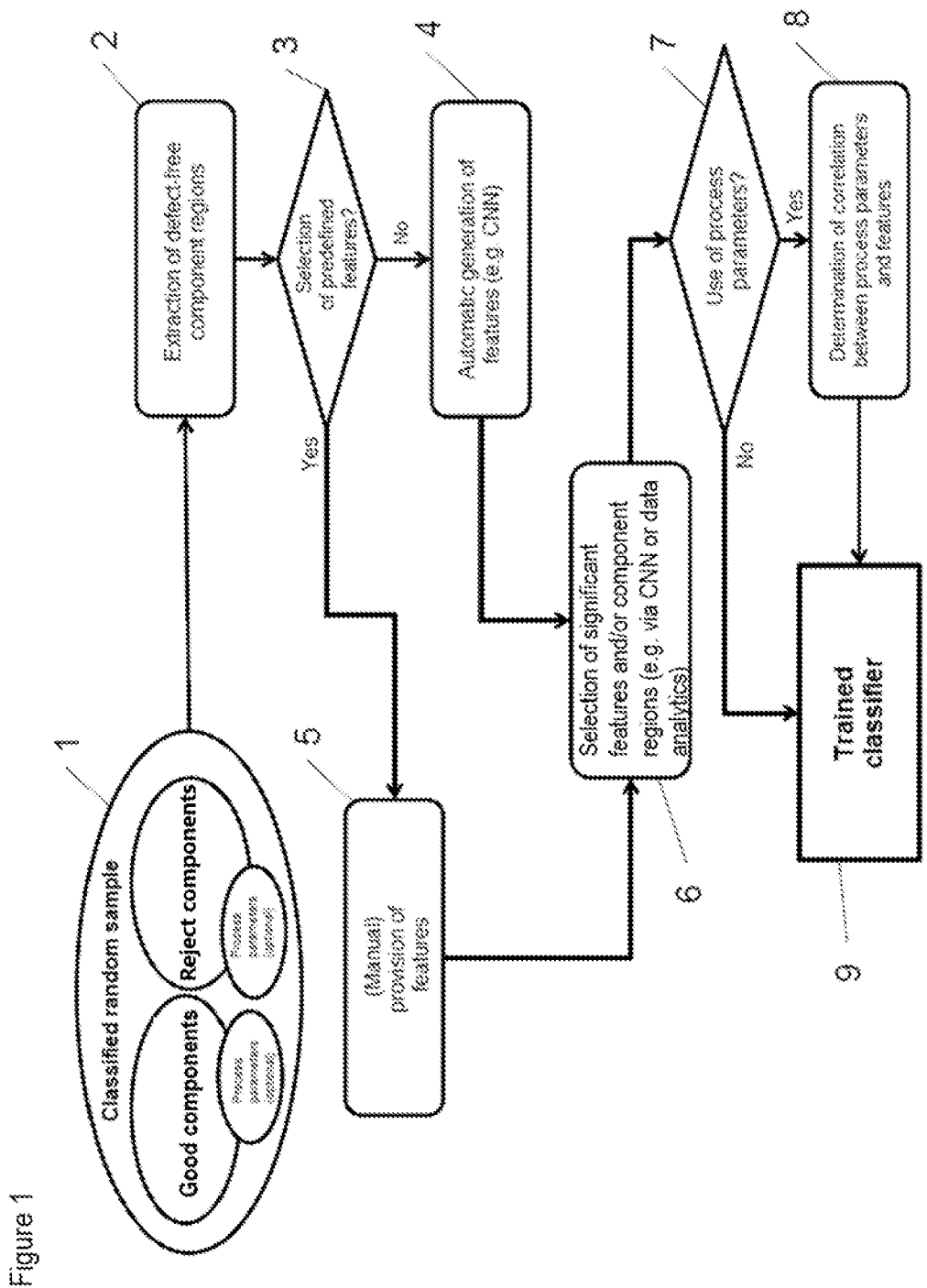
FIG. 1 a flow diagram of a learning phase according to the invention.

In FIG. 1, the principle flow of a method in its learning phase according to the invention is represented. This learning phase is explained in more detail in the following.

For obtaining the features, first of all a classified random sample is necessary (step no. 1), i.e. in the case of a simple two-class problem a subdivision for example into the classes "good" and "bad". However, it is also possible to solve problems which work with more than two classes. The random sample must have an adequate number of elements. The number of elements depends on the complexity of the classification task and can produce good results with a few hundred elements; in individual cases, however, a volume of millions of (partial) data sets may also be necessary. Each element must be clearly assigned to a class so that the classification system can be trained.

In step no. 2, defect-free component regions are extracted. On the basis of the quality criteria which are defined for the component to be examined in each case, regions in the component can be excluded. If, for example, porosities are decisive for the component quality, component regions which contain porosities are not used for obtaining the features. Further quality criteria in addition to the pore size can e.g. be: geometric deviations from the specified size or the drawing specifications (CAD); cracks in the component; separation of material constituents; shrinkage holes; foreign body inclusions.

The extraction of defect-free component regions can be effected manually, wherein the operator decides visually whether an extracted region is defect-free or not. An automatic extraction and evaluation is likewise possible since for all of the quality criteria described automatic image processing methods exist which can detect defects. Thus, a method for extracting defect-free component regions could be designed such that regions are extracted from the volume data set of the component in a stepwise manner and are evaluated using an image processing method. If defects are detected, this region is discarded and not used for the training. Regions which are not rejected through the image processing are incorporated into the training or the application.

In step no. 3 it is queried whether a selection of predefined features is to be effected.

If the answer to this is no—in accordance with step no. 4—neural networks or machine learning approaches offer the possibility, on the basis of the classified random sample, to automatically determine features which demonstrate a correlation between the inspection decision made for the component and structural properties of the component interior. In the case of such approaches, models such as multiple instance learning are used, among others, in order to maximize the learning success.

In contrast, if the answer to the question in step 3 is yes, in accordance with step no. 5, predefined features are provided. For this purpose, conventional statistical methods from the field of data analytics can be used to identify the features which produce the above-described correlation. It is a prerequisite that these features are selected in advance. This can be effected either manually by experienced image processing specialists or through automated processes which are used in image processing—e.g. by means of genetic programming.

Next, in accordance with step no. 6—following step no. 4 or 5—a selection of significant features and/or component regions is effected. This can be effected e.g. via neural networks or data analytics. In addition to the type of the features, such as e.g. local density distributions, orientations of fibres or local wall thickness variations, the position in the component in which the characteristic feature is determined can also be important in order to demonstrate the above-described correlation. The limitation of one or more features to particular zones/regions of a component can contribute to the significance of the features.

In step no. 7, it is queried whether additional environmental data are to be fed into the training of the classification system.

If the answer to this is yes, in step no. 8 the correlation between the process parameters and the characteristic feature is determined. This is in turn effected using neural networks or data analytics. If the features which ultimately make an assessment of the process quality possible are identified, the task set in this step is to find matches between particular process parameters and the characteristic of features. For example, through the analysis it can be established that, in the case of high pressures, particular features assume specific values or form patterns. A correlation between a characteristic feature and one or more process parameters is thereby produced. If this characteristic feature were to be detected during operation, regulation of the pressure can be introduced as a countermeasure, for example.

Following step no. 8—or directly if the answer to the question in step no. 7 is no—a trained classifier is established in step no. 9. When the learning process is completed, for example when a neural network is used, a trained network is present (filter settings and weightings for each neuron in the network). This network with its parameters represents the classifier. In the case of predefined features, it is the characteristic features significant for each class (optionally also relative to the positions in the component at which the feature is evaluated) which represent the trained knowledge of the classifier.

Figure 2:
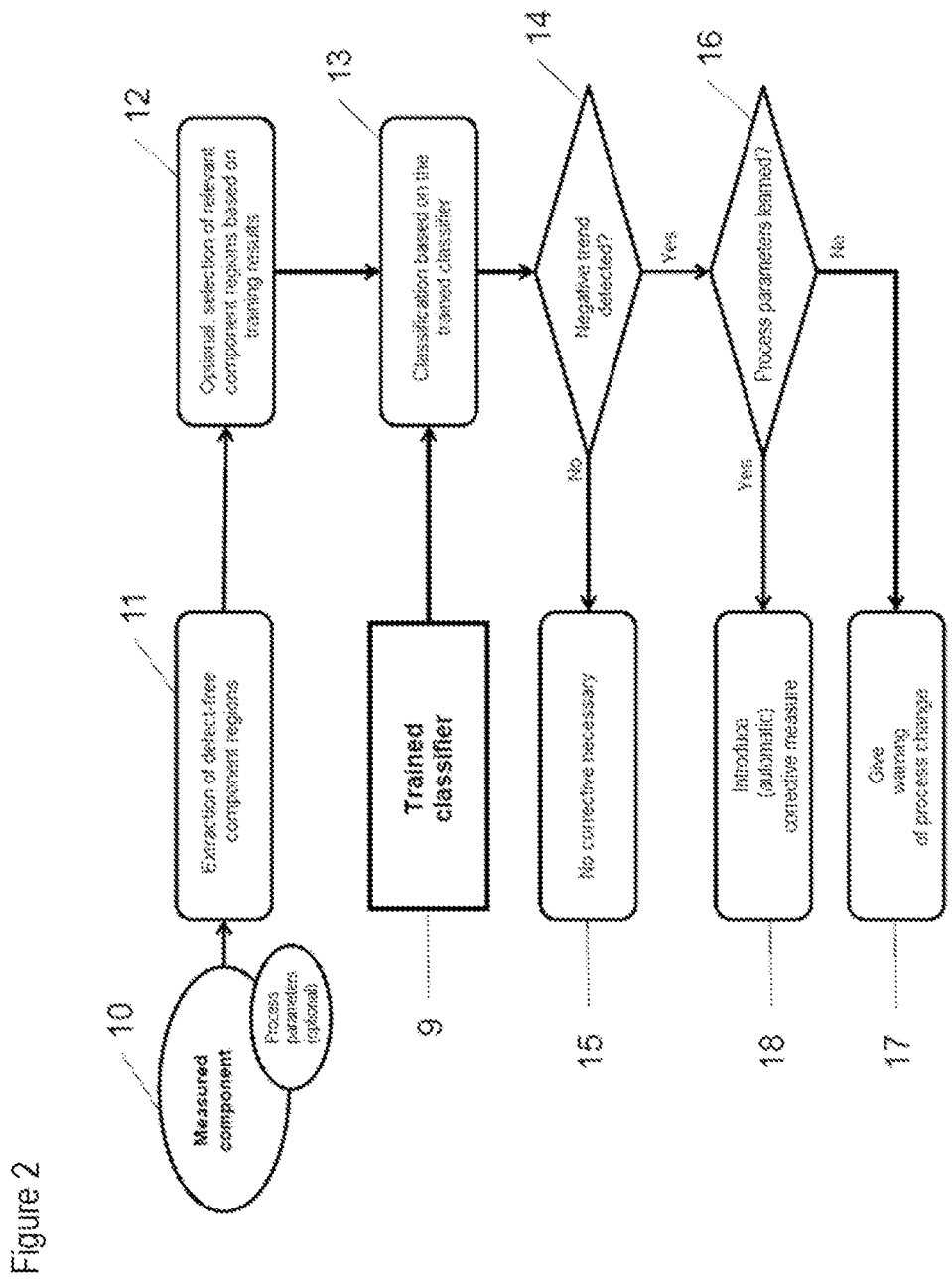
FIG. 2 a flow diagram of an application phase according to the invention after carrying out the learning phase.

In FIG. 2, the principle flow of a method in its application phase according to the invention is represented, which is explained in more detail in the following.

If the significant features, the specific characteristics thereof and optionally the local relevance thereof are selected through the above-described method of the learning phase (step no. 9), these are used in normal operation—series inspection. Here, either every component (inline operation) or a relevant random sample (e.g. every tenth component) is examined using X-ray CT in accordance with step no. 10.

Defect-free component regions are extracted in accordance with step no. 11 in analogy to the training.

Optionally, a selection of relevant component regions can also be effected in accordance with step no. 12, based on the results of the learning phase.

By means of the trained classifier previously established in the learning phase in accordance with step no. 9, in step no. 13 a calculation of the features and classification is then performed. For this purpose, the previously identified features are evaluated in the possibly relevant component regions. The sum of the individual results (each feature in the various evaluated component regions) is in turn evaluated using a classification method (for example using a neural network) and, in accordance with step no. 14, a decision is made as to whether a negative trend is detected.

This decision is, in accordance with step no. 15, an indication for the operator that no corrective is necessary if a negative trend was not detected in step no. 14.

If a negative trend was detected in step no. 14, in accordance with step no. 16 a query is effected as to whether process parameters were learned.

In the simplest case—if the answer to this is no—in accordance with step no. 17 a warning of a process change is given. This means that the process demonstrates a trend which makes the production of rejects likely.

If learned process parameters are present, the answer to the query of step no. 16 is yes and a correlation between the features which can predict the occurrence of discontinuities and potential causes can additionally be demonstrated. Such environmental data can be primary influencing factors such as parameters of the production machine (pressures, temperatures, stresses, flows), but also secondary influencing factors such as e.g. ambient temperatures, air humidities and operators. Decisive for finding the features in the learning phase is that the significance is detected over the course of time of the production of the components. Conclusions on the process behaviour and the detection of trends, which is ultimately a prerequisite for proactive action to avoid rejects, are only possible over time.

In the event that additional environmental parameters are involved, in accordance with step no. 18 the method is used to engage in the process automatically and identified process parameters (e.g. pressures) are changed via the classification system. The negative trend of the production process is thereby counteracted and the formation of reject parts is already prevented in advance.

The invention can thus be summarized as follows:

The aim of the methods according to the invention is not to detect the exceeding of limits in relation to unacceptable discontinuities, but to use variations from component to component which are within acceptable ranges to control the process. The method requires a non-destructive series testing; in the embodiment example computed tomography is used for this. Thus, for each inspected component a 3D data set is produced, which reproduces the internal structure of a component. Through inspection of the series, it is possible in principle to detect changes in the manufacturing process. Trends which have a predictive character are thereby made visible. It thus becomes possible to predict changes in the process and thus to counteract deteriorations in the process through an intervention.

It is an essential part of the method that information is obtained exclusively from the component regions which are free from discontinuities or defects. Depending on the component characteristic and process variant, there are various features which can demonstrate a correlation with component quality and process quality.

The decisive difference between the invention and methods from the state of the art is that it relies primarily only on information which is obtained from defect-free regions of the component. To increase the significance of characteristic features it is also possible, however, additionally to use information from defect-prone regions. Methods which derive the information from the defects of a component cannot obtain any meaningful information in the sense of process evaluation and process influencing from defect-free components. Since, however, trends can also become visible in the case of defect-free components, there is a monitoring gap in the case of the methods according to the state of the art. A zero-defect production is thus not possible since defects are always necessary for information to be obtained. Such methods are thus exclusively reactive. In contrast to this, the method according to the invention described here is proactive since it does not require any defect-prone components to trigger an action in the application phase.

What is claimed is:

1. A method for obtaining at least one significant feature in a series of components of the same type on the basis of data sets, which have been obtained by means of a non-destructive testing method, having the following steps:
   a) examining a classified random sample of components in a production process, the sequence of the production process of which is known, by means of a non-destructive testing method which obtains in each case a 3D data set for each component;
   b) splitting the components of the random sample into good parts and reject parts;
   c) extracting defect-free component regions from all of the components of the random sample;
   d) determining in the extracted defect-free component regions at least one feature which is characteristic of the components of the same type and the production process thereof and which, over the course of time of the production of the components, exhibits considerable differences in its characteristic between good parts and reject parts, by means of neural networks, machine learning approaches, such as multiple instance learning, or statistical methods of analyzing data, or, from a predetermined quantity of features, by means of genetic programming or conventional statistical methods; and
   e) defining this at least one feature and its characteristic as a trained classifier.

2. The method according to claim 1, in which, in addition to step e, at least one process parameter is incorporated into the production of the components in that it is determined whether there is a correlation between this process parameter and the at least one feature and the characteristic thereof and, if this is the case, this at least one feature and its characteristic is defined as trained classifier, otherwise the above determination of the correlation is carried out for another process parameter until there is a correlation and then the at least one feature is defined as trained classifier; if a correlation is not found for any of the process parameters, the steps of claim 1 are carried out for another feature and then the above steps of this claim are repeated for this other feature.

3. The method according to claim 2, in which several features are determined in accordance with step d of claim 1 and, by means of a combination of at least two features, the correlation with at least one process parameter is produced.

4. The method according to claim 2, in which pressures, temperatures, stresses or flows of the production process, ambient temperatures or air humidities are used as process parameters.

5. The method according to claim 1, in which the method is carried out only on a spatial region of the components that can be predetermined.

6. A method for the classification of a component of a series of components of the same type on the basis of data sets, which have been obtained by means of a non-destructive testing method, having the following steps:
   a) examining a classified random sample of components in a production process, the sequence of the production process of which is known, by means of a non-destructive testing method which obtains in each case a 3D data set for each component;
   b) splitting the components of the random sample into good parts and reject parts;
   c) extracting defect-free component regions from all of the components of the random sample;
   d) determining in the extracted defect-free component regions at least one feature which is characteristic of the components of the same type and the production process thereof and which, over the course of time of the production of the components, exhibits considerable differences in its characteristic between good parts and reject parts, by means of neural networks, machine learning approaches, such as multiple instance learning, or statistical methods of analyzing data, or, from a predetermined quantity of features, by means of genetic programming or conventional statistical methods;
   e) defining this at least one feature and its characteristic as a trained classifier,
   f) using the trained classifier to carry out a trend analysis of whether a development of the characteristic feature of a reject part is present by means of neural networks, machine learning approaches, such as multiple instance learning, or statistical methods of analyzing data, or, from a predetermined quantity of features, by means of genetic programming or conventional statistical methods; and
   g) communicating that no corrective measures are necessary in the component production process when no such development was detected, or alternatively communicating a warning and/or carrying out automatic corrective measures in the component production process.

7. The method according to claim 6, in which at least one defect-free component region is extracted in the examined component and the above method for classification is carried out only in this defect-free component region.

8. The method according to claim 6, in which the nondestructive testing method carried out is a computed tomography method, in particular an X-ray tomography method.

9. The method according to claim 1, in which the nondestructive testing method carried out is a computed tomography method, in particular an X-ray tomography method.

* * * * *